United States Patent

[11] 3,610,699

| [72] | Inventors | Joseph Ladoniczki;<br>Clara Ladoniczki, both of 4901 Shetland Ave., Tampa, Fla. 33615 |
|---|---|---|
| [21] | Appl. No. | 784,031 |
| [22] | Filed | Dec. 16, 1968 |
| [45] | Patented | Oct. 5, 1971 |

[54] BRAKE CONTROL MEANS AND SYSTEMS FOR DRAWN VEHICLES EFFECTING SYNCHRONOUS COACTION WITH THE BRAKING SYSTEM OF AN ASSOCIATED DRAFT VEHICLE
4 Claims, 13 Drawing Figs.

[52] U.S. Cl................................................. 303/7,
188/3, 303/3, 303/15, 338/96
[51] Int. Cl...................................................... B60t 13/74,
B60t 7/04
[50] Field of Search............................................. 338/96 X,
128–130, 99, 108; 188/3; 303/7–8, 2–3, 13, 15, 16–17, 20

[56] References Cited
UNITED STATES PATENTS

| 2,091,086 | 8/1937 | Taylor | 338/108 X |
| 2,169,668 | 8/1939 | Thomas | 303/7 X |
| 3,125,739 | 3/1964 | Deibel et al. | 338/99 |
| 3,135,358 | 6/1964 | Greentree | 188/3 |
| 3,423,135 | 1/1969 | Beltramo | 303/7 X |
| 3,486,799 | 12/1969 | Greentree | 303/7 |
| 3,507,541 | 4/1970 | Ayers | 303/7 |

Primary Examiner—Milton Buchler
Assistant Examiner—John J. McLaughlin
Attorney—Birch and Birch ABSTRACT: A safe, dependable brake control system for drawn vehicles such as boat trailers is provided in which a variable resistance control device is mounted on the foot operated brake pedal of the draft vehicle. The variable resistance device synchronizes the action of the drawn vehicle brakes with those of the draft vehicle by responding to foot pressure on the draft vehicle brake pedal to proportionately control the flow of electric current to electromagnetic brake actuators on each wheel of the drawn vehicle. A selector switch readily adapts the variable resistance control device and the system in which it is incorporated to either two wheel or four wheel braking systems on the drawn vehicle.

PATENTED OCT 5 1971

INVENTORS
JOSEPH LADONICZKI
CLARA LADONICZKI

BY
*Birch & Birch*
ATTORNEY

PATENTED OCT 5 1971
3,610,699
SHEET 2 OF 3
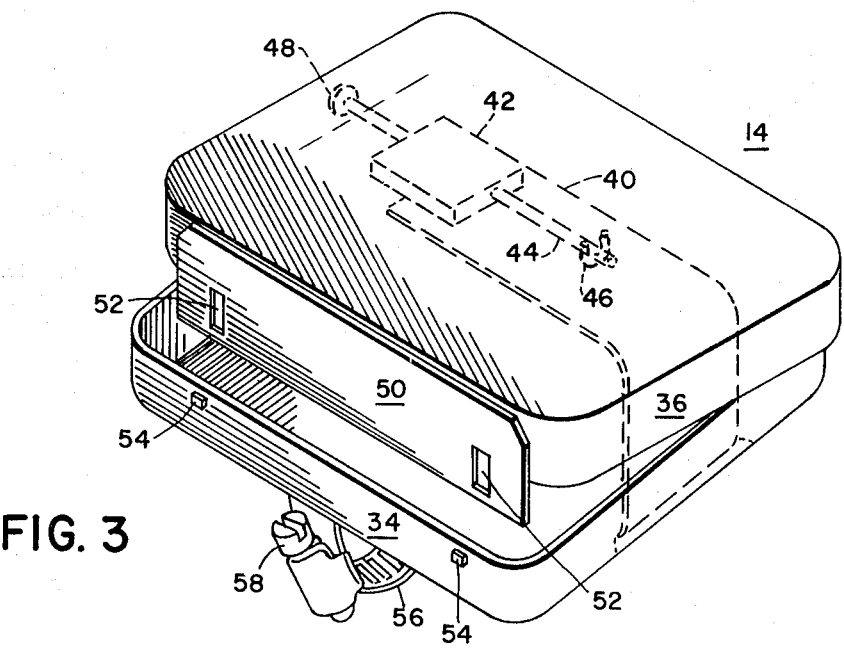
FIG. 3
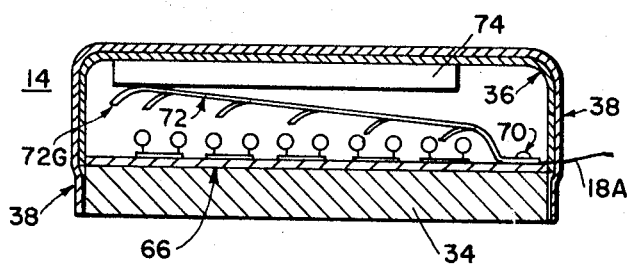
FIG. 4
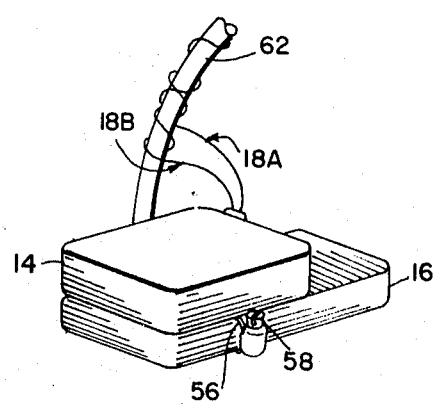
FIG. 5
FIG. 6
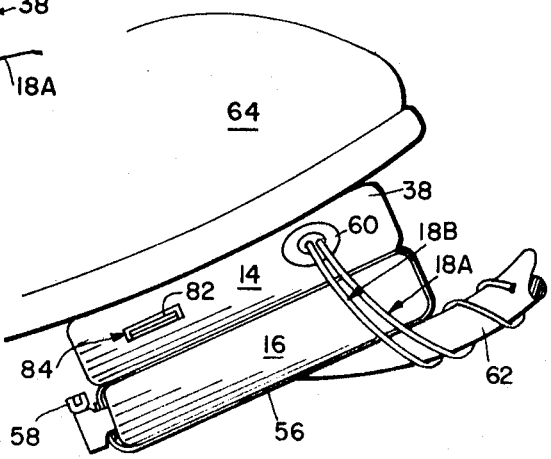
INVENTORS
JOSEPH LADONICZKI
CLARA LADONICZKI
BY  *Birch & Birch*
ATTORNEY

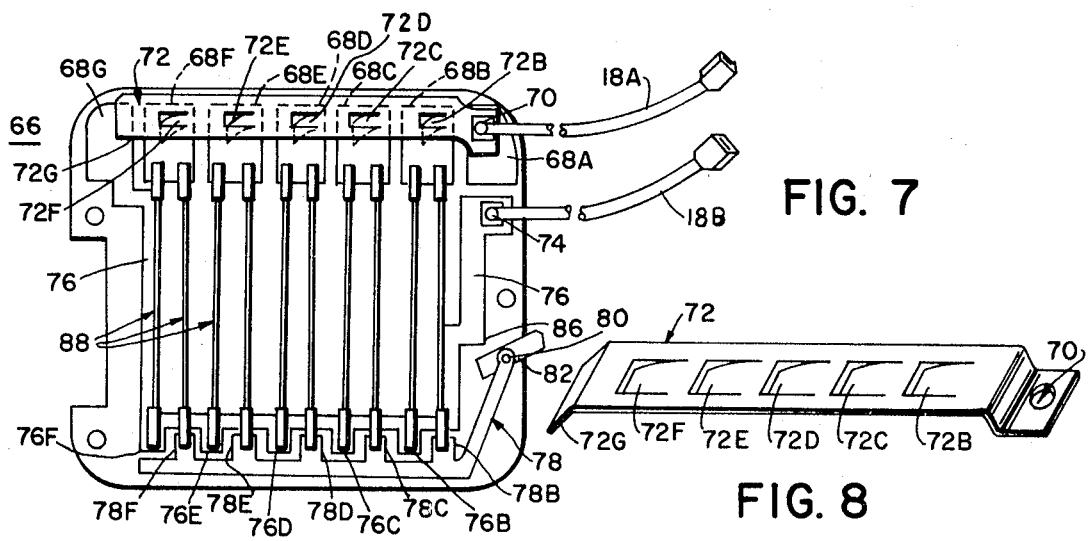
FIG. 7
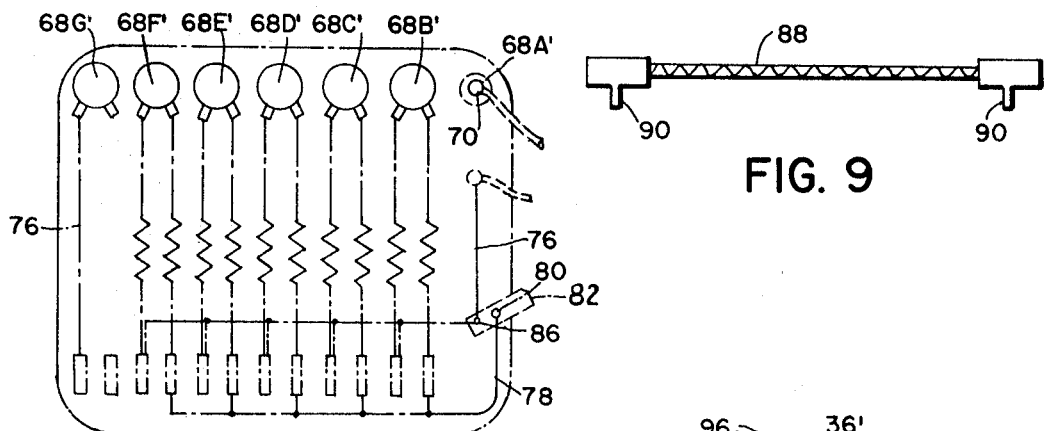
FIG. 8
FIG. 9
FIG. 10
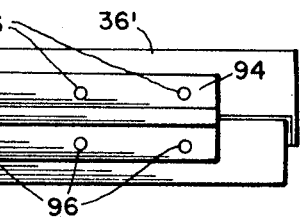
FIG. 12
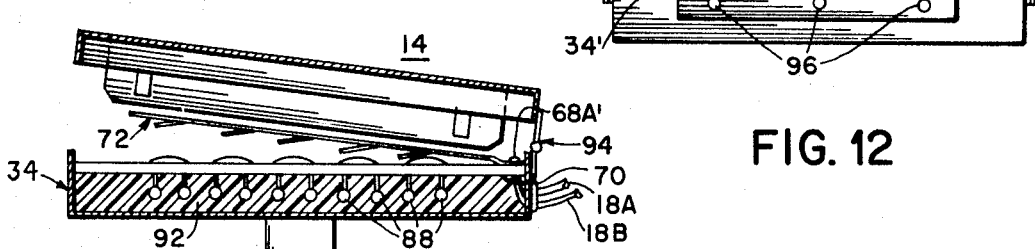
FIG. 11
INVENTORS
JOSEPH LADONICZKI
CLARA LADONICZKI
BY 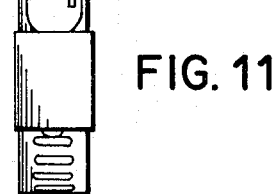
ATTORNEY

3,610,699

BRAKE CONTROL MEANS AND SYSTEMS FOR DRAWN VEHICLES EFFECTING SYNCHRONOUS COACTION WITH THE BRAKING SYSTEM OF AN ASSOCIATED DRAFT VEHICLE

This invention relates to automotive braking systems and, more particularly, to automotive braking systems for drawn vehicles which are fully coordinated with the braking system of a draft vehicle without the need for hydraulic interconnection therebetween.

In the past, where hydraulic systems must be interconnected between a draft vehicle and a drawn vehicle, fluid leakage often results, rendering the dual braking system inoperative and often resulting in a tragic and unnecessary loss of life and limb.

Also, other braking systems are in existence which are hand or foot operated apart from the draft vehicle system. Such systems are, at best, difficult to synchronize and drawn vehicle overrun, jackknifing and overbraking occur, often with serious and tragic results.

It is, therefore, an object of this invention to provide new and novel draft and drawn vehicle braking systems which are fully synchronized to preclude uneven braking rates and establish smooth, safe and reliable decelerations of draft and drawn vehicle combinations.

It is another object of this invention to provide new and novel draft and drawn vehicle braking systems which are fully synchronized to preclude uneven braking rates and establish smooth, safe and reliable decelerations of draft and drawn vehicle combinations; wherein hydraulic interconnection between the draft vehicle and the drawn vehicle is obviated.

Another object of this invention is to provide new and novel pressure responsive transducer means effecting synchronous coaction of the braking system of a drawn vehicle with that of a draft vehicle.

Still another object of this invention is to provide new and novel pressure responsive transducer means effecting synchronous coaction of the braking system of a drawn vehicle with that of a draft vehicle, wherein said pressure responsive transducer means comprises a variable electrical resistance complex.

Still another object of this invention is to provide new and novel pressure responsive transducer means effecting synchronous coaction of the braking system of a drawn vehicle with that of a draft vehicle, wherein said pressure responsive transducer means comprises a variable electrical resistance in a printed circuit modular configuration.

Still another object of this invention is to provide new and novel pressure responsive transducer means effecting synchronous coaction of the braking system of a drawn vehicle with that of a draft vehicle, wherein said pressure responsive transducer means comprises a variable electrical resistance in a printed circuit modular configuration which is adapted to be mounted on the brake pedal of the brake system of a draft vehicle and to be engaged by the foot of the driver or vehicle operator when applying the brakes of the said draft vehicle.

Still another object of this invention is to provide a new and novel electromagnetically controlled braking system for drawn vehicles having one or more pairs of wheels to be braked.

Yet another object of this invention is to provide a new and novel electromagnetically controlled braking system for drawn vehicles having one or more pairs of wheels to be braked wherein said system includes new and novel pressure responsive transducer means controlling the braking force effected by electromagnetic control means in said system.

These and other objects of this invention will become more fully apparent with reference to the following specification and drawings which relate to several preferred embodiments of the invention.

In the drawings:

FIG. 3 is an exploded perspective of the pressure responsive transducer means of the present invention;

FIG. 4 is a schematic cross section of the pressure responsive transducer means of the present invention;

FIG. 5 is a top plan view of the brake pedal of a draft vehicle having mounted thereon a pressure responsive transducer of the present invention for controlling the brake system of the present invention in an associated drawn vehicle;

FIG. 6 is a side elevation of FIG. 5 with an operator's foot shown in engagement with the transducer of the present invention;

FIG. 7 is a top plan view of a printed circuit impedance network comprising an operative element of the transducer of FIGS. 3–6;

FIG. 8 is a detail, in perspective, of a multiple contact spring means shown in cross section in FIG. 6 and in top plan in FIG. 7; and FIG. 9 is a detail in side elevation of a resistance element comprising part of the resistance complex network of the circuit board shown in FIG. 6 and 7.

FIGS. 10–12 are another embodiment showing a modified printed circuit board.

THE SYSTEM

Basically, the invention contemplates controlling the flow of operating current to electromagnetic brake operators on the wheels of a drawn vehicle in fully synchronized proportion with the braking force applied to the brake pedal of a draft vehicle, such that both the draft and drawn vehicles will be braked at an optimally similar rate of retardation. This is accomplished by a transducer means mounted on the brake pedal of the draft vehicle. The transducer means provides a resistance change in the electrical actuating circuit of the brake system in the drawn vehicle to proportionately deliver actuating current to electromagnetic brake actuators in the said drawn vehicle brake system as a function of the brake pedal actuating pressure in the draft vehicle.

Figure 1:
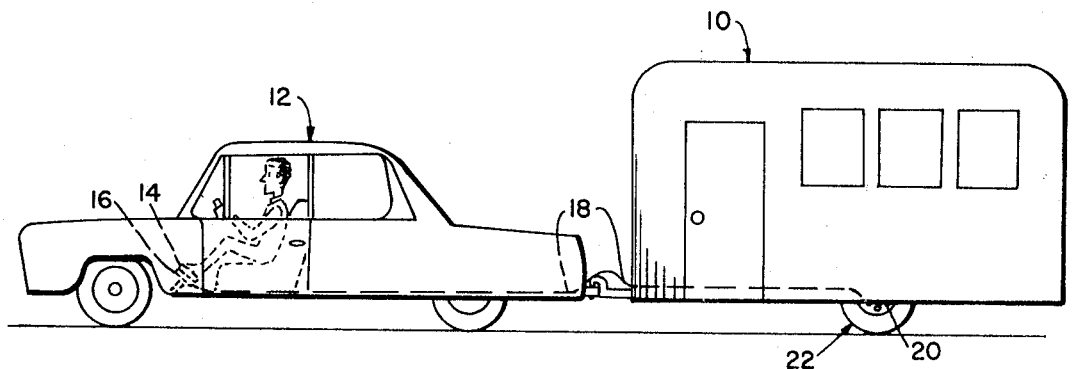
FIG. 1 is a schematic illustration of a draft vehicle and a drawn vehicle equipped with the brake control means and system of the present invention.

Referring in detail to the drawings, and more particularly to FIG. 1, the brake system of the present invention is shown embodied in a drawn vehicle 10 (trailer) pulled by a draft vehicle 12 (passenger car).

The brake system is shown as including a pressure responsive transducer means 14, mounted on the brake pedal 16 of the draft vehicle 12. The transducer means 14 is connected through an electrical coupling lead means 18 to electromagnetically controlled brake means 20 at the wheels 22 of the drawn vehicle 10.

Figure 2A:
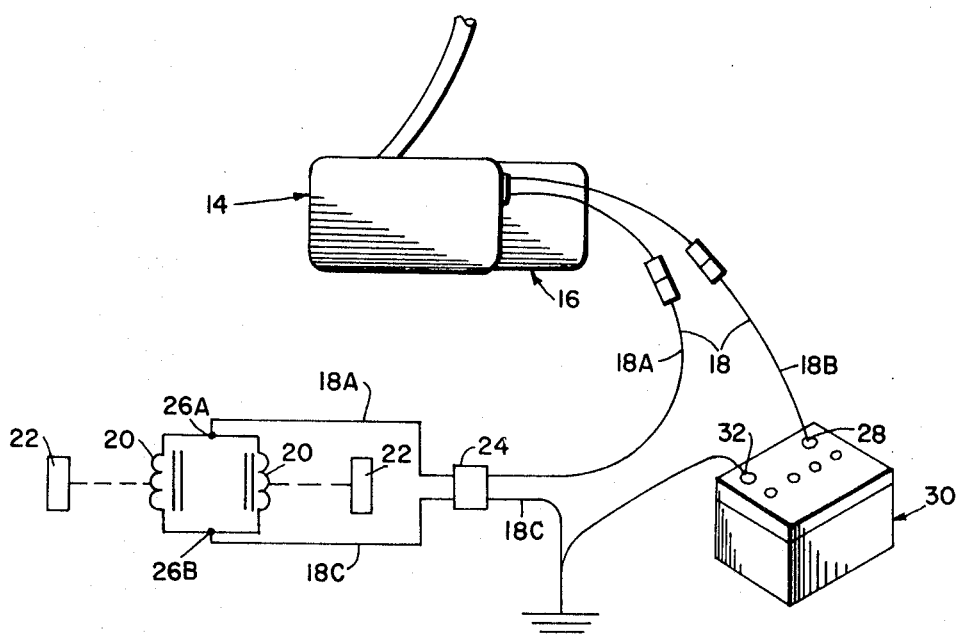
FIG. 2A is a schematic diagram of a drawn vehicle brake control system of the present invention as adapted to drawn vehicles having a single pair of braked wheels.

For drawn vehicles having a single pair of braked wheels, reference is now made to FIG. 2A, wherein like elements to FIG. 1 bear like numerals.

The transducer means 14 on the brake pedal 16 is shown as connected through first and second control leads 18A and 18B, comprising the electrical coupling lead 18, directly through one terminal of an intervehicle connector plug and socket means 24 to the first of first and second energizing terminals 26A and 26B of the drawn vehicle system and the positive terminal 28 of an energizing source 30 shown as a storage battery, respectively.

The negative terminal 32 of the source 30 is connected to ground as is the second energizing terminal 26B in the drawn vehicle brake system. The said second energizing terminal 26B is connected to ground via a third control lead 18C extending therefrom through the coupling plug and socket means 24.

Therefore, any flow of actuating current from the source 30 to the electromagnetic actuators 20 on the drawn vehicle wheels 22 is controlled by the transducer means 14 as will be more fully described hereinafter.

Figure 2B:
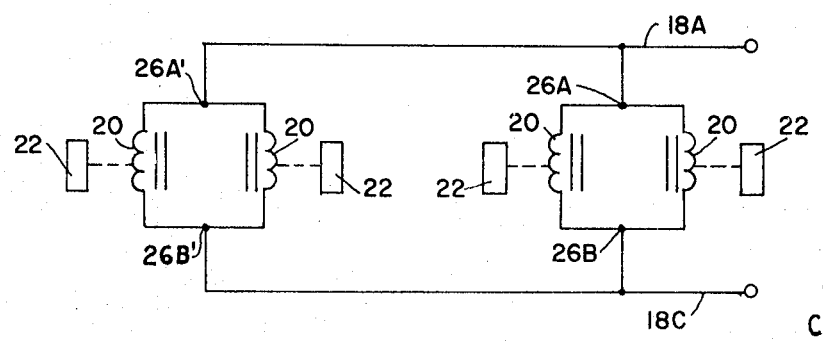
FIG. 2B is a schematic illustration of how the system of FIG. 2A can be readily adapted to drawn vehicles with two pairs of braked wheels.

Referring now to FIG. 2B, the system of FIG. 2A is shown as readily modified to effect braking control on two pairs of wheels 22 of a drawn vehicle.

Parallel energizing terminals comprising third and fourth such terminals 26'' and 26B' are provided in the first and third control leads 18A and 18C, respectively, and an additional pair of electromagnetic actuator windings 20 are connected in parallel between the said third and fourth terminals. Each of the said windings 20 controls the brake of an associated wheel 22 of a drawn vehicle.

THE TRANSDUCER MEANS

Referring now to FIGS. 3, 4, 5 and 6, the transducer means 14 (drawn vehicle brake controller) is shown in FIGS. 3 and 4 as comprising a base plate member 34 which is telescopically received within a top housing 36 over which an elastomeric cover or shield 38 is disposed. The shield 38 covers all of the top housing 36 and the majority of the edge surfaces of the base plate 34 as shown in FIG. 4.

As shown in phantom lines in FIG. 3, the top housing 36 is biased away from the base plate 34 by means of a cantilever spring means 40 which is mounted at its fixed end in a central edge portion of the base plate 34. The spring means 40 engages a pressure block 42, the latter being juxtaposed with the upper wall of the top housing 36 and which is mounted for translation along a pressure adjusting screw 44 anchored to the inside of the top wall of the said top housing 36 by suitable retaining means 46. The head or control knob 48 for the pressure adjusting screw 44 extends to the exterior of the top housing 36 adjacent the free end of the cantilever spring means 40 for a purpose to be more fully described hereinafter.

As shown in FIG. 3, the top housing 36 is limited in its extent of movement with respect to the base plate 34 by means of one or more flexible side flanges 50 having vertical guide slots 52 formed therein. The vertical flanges 50 overly one or more edge faces of the base plate 34 and each guide slot 52 slidably receives a guide detent 54 which is fixed in the adjacent edge face of the hose plate 34. The length of the guide slots 52 thus determines the relative telescopic displacement of the top housing 36 and base plate 34 due to the coaction with the said guide slots 52 of the guide detents 54.

As shown in FIGS. 3, 5 and 6, the base plate 34 mounts a retaining clamp 56 which includes an adjusting setscrew 58 for the purpose of clamping the entire transducer means 14 to the top or actuating surface of a conventional brake pedal 16 of a draft vehicle.

The control leads 18A and 18B extend through a lead port 60 in the transducer means 14 (top housing 36 and elastomeric cover 38) and are then coiled around the brake pedal lever 62 as clearly shown FIGS. 5 and 6.

Further, as shown in FIG. 6, the upper surface of the transducer means 14 is adapted to be engaged (through the elastomeric cover 38) by the foot 64 of a draft vehicle operator. Thus, when brake actuating pressure is applied to the transducer means 14 by the operator's foot 64, it is simultaneously applied to the brake 16 of the draft vehicle through the transducer means 14.

To fully coordinate and synchronize the braking action of both the draft and drawn vehicles, the transducer means 14 is provided with a pressure variable impedance network which presents an impedance to current flow, in the systems of FIGS. 2A and 2B, from the source 30 through the control leads 18A and 18B, the electromagnetic brake actuators 20 and the control lead 18C, which resistance is inversely proportional to the brake actuating pressure applied to the combined transducer 14-brake pedal 16 by the operator's foot 64.

Referring jointly to FIGS. 4, 7, 8 and 9, tHe transducer 14 is shown as including a printed circuit board 66 fixed to the interior surface of the base block 34.

The printed circuit board 66 is shown as including a plurality of individual printed contacts 68A–68G, in physical alignment and closely spaced but electrically isolated proximity across one edge of said board 66.

The first printed contact 68A is coincident with a first power terminal 70 for the first control lead 18A, which first power terminal 70 also serves as a holddown means for a cantilever spring contact means 72.

The spring contact means 72 includes a plurality of dependent spring contact fingers 72B–72G adapted, respectively, to electrically engage the printed contacts 68B–68G on the printed circuit board 66. The spring contact means 72 is in full electrical contact with the first control lead 18A and the first power terminal 70.

As most clearly shown in FIG. 4, the spring contact means 72 is angled upward from the first source terminal 70, overlying the printed contacts 68A–68G, into engagement with a dielectric thrust transmitter 74, the latter being fixed to the upper interior surface of the top housing 36 by adhesive, or by upset portions of the said top housing, or by other fasteners. Thus, for a purpose to be more fully described hereinafter, downward pressure on the top housing 36 will force the thrust transmitter 74 down against the spring contact means 72 and cause the contact fingers 72B–72G to engage the printed contacts 68B–68G in consecutive order. This order is also cumulative, as an increasing number of the printed contacts 68B–68G are engaged by the contact fingers 72B–72G as the spring contact means 72 is depressed from its normal raised position to its fully depressed position.

Referring back to FIG. 7, the second control lead 18B is shown as connected with a second control terminal 74 on the circuit board 66. The second control terminal 74 is connected through a first printed bus bar 76 to the last printed contact 68G in the contact series 68.

The first bus bar 76 has a first plurality of printed connector tabs 76B–76F located directly opposite the printed contacts 68B–68F, respectively.

A second printed bus bar 78 is provided on the circuit board 66 and includes a second plurality of connector tabs 78B–78F, respectively interleaved with the first plurality of connector tabs 76B–76F and electrically isolated therefrom. The said second bus bar 78 extends from a point adjacent the last connector tab 76F of the first plurality of connector tabs 76B–76F to a position adjacent the second control terminal 74 and the proximate portion thereto of the first bus bar 76, at which the said second bus bar 78 terminates in a pivot structure comprising a switch terminal 80.

A single-pole double-throw flat switchblade 82 is mounted intermediate its ends on the pivot type switch terminal 80. One end of the switchblade 82 extends beyond the circuit board and out through the top housing 36 of the transducer means 14 as clearly shown in FIG. 6 and is limited in motion by the ends of an elongated switchblade port 84 formed in the top housing 36 and its elastomeric cover member 38. The outer end of the switchblade 82 is adapted to be selectively placed in electrical contact with an offset portion 86 of the first bus bar 76 for a purpose to be more fully described hereinafter.

A first plurality of elongated wire wound resistors 88, such as illustrated in detail in FIG. 9, and generally in FIG. 7, are provided with male snap connectors 90 at both ends thereof. The male snap connectors 98 are adapted to engage with female snap connectors (not shown) in the printed circuit board 66 through each of the contacts 68B–68F, each of the connector tabs 76B–76F and each of the connector tabs 78B–78F.

The printed circuit contacts 68B–68F are each conductively connected with one end of respective pairs of the elongated resistors 88. The other ends of one of the resistors 88 in said pairs are connected to respective ones of the connector tabs 76B–76F on the first bus bar 76 and the other ends of the other of the resistors 88 in said pairs are connected to respective ones of the connector tabs 78B–78F.

Thus, when the switchblade 82 is in its two wheel brake position (out of engagement with the offset portion 86 of the first bus bar 76), one half of the resistors 88 are adapted to be ultimately connected in parallel across the first and second control terminals 70 and 74 by the spring contact means 72.

On the other hand, when the switchblade 82 is in its form wheel brake position (engaged with the offset portion 86 of the first bus bar 76), the first and second bus bars 76 and 78 comprise a common circuit node and all of the resistors 88 are adapted to be ultimately connected in parallel across the first and second control terminals 70 and 74 by the spring contact means 72.

Referring next to FIGS. 10 and 11, another embodiment of the present invention is shown, wherein the printed circuit board is modified; the top housing is joined to the lower housing in a different manner; and the entire circuit board, including the resistors 88, is inverted and sealed into the lower housing with a potting compound.

The printed circuit board 66 of FIG. 7, designated as 66' in FIGS. 10 and 11, is shown as including a plurality of enlarged head rivets 68A'-68G' in place of the printed contacts 68A-68G, respectively, in the previous embodiment.

The rivets 68B'-68G' are exposed at the upper surface of the circuit board 66' for engagement with the contact fingers 72B-72G, respectively, of the progressive spring contact means 72.

Further, as indicated, the selector switch 82, pivot 80 thereof, contact 86 and related portions of the circuit busses 76 and 78 are exposed on the upper surface of the circuit board 66' while all of the other components described in the previous embodiments as forming part of the circuit board 66 are mounted on the lower surface of the circuit board 66'.

It is to be expressly understood that the circuit boards 66 and 66' need not be comprised of printed circuits but may utilize conventional wiring and terminal configurations in similar circuit patterns for the purpose intended.

As clearly shown in FIG. 11, the circuit board 66' is potted by epoxy 92 or the like in the lower housing shell 34', which supplants the mounting block 34 of the previous embodiments. All of the circuit elements such as the resistors 88 and the majority of the bus bars 76 and 78 and terminals 76B-76E and 78B-78E are completely encased in the potting compound 92.

Referring jointly to FIGS. 11 and 12, it is readily seen that the upper or top housing 36' is joined to the bottom housing shell 34' by a spring hinge plate 94 which is spot-welded at several points 96 to both housing sections 34' and 36' across the gap 98 therebetween.

This spring hinge 94 either supplants or supplements the action of the cantilever spring 40 of FIG. 3, which spring 40 and all other components of the previous embodiments are intended for interchangeable use in the embodiment of FIGS. 10, 11 and 12 and vice-versa.

OPERATION

Referring first to the schematics of FIGS. 1, 2A and 2B, the general operation of the system of the present invention will now be described.

When the draft vehicle 12 is braked, it is essential that initial braking of the drawn vehicle 10 be effected just prior in time to the initial braking of the draft vehicle 12. This causes the drawn vehicle 12 to track properly behind the draft vehicle 10.

Further, the proportional braking effort applied to the brake actuators 20 on the wheels 22 of the drawn vehicle 10 at any given point in time should be slightly greater than that applied to the conventional brakes (not shown) of the draft vehicle 12 via the brake pedal 16 of the latter.

The basic operation of the draft vehicle brake control transducer 14, which will be described in detail hereinafter with reference to the remaining Figures of the drawings, comprises an initial closing of the circuit across the control leads 18A and 18B through a single resistive impedance and thence, progressively, through a plurality of parallel impedances in response to the applied pressure to the brake pedal 16. This controls the flow of energizing current from the battery 30 to the electromagnetic brake actuators 20 in the drawn vehicle 10 via the control leads 18A and 18C as schematically shown in FIGS. 2A and 2B.

Further provision is made in the transducer 14 in the case of a panic stop situation, to respond to a sudden hard braking pressure applied to the brake pedal 16 of the draft vehicle to shunt out the resistive impedances shortly after the initiation of the sudden braking pressure and apply maximum operating current to the electromagnetic brake actuators 20 from the battery 30. Thus, because the transducer 14 is superimposed on the brake pedal 16, both initial and maximum braking action on the brake actuators 20 of the drawn vehicle 10 are effected, respectively, at prior points in time to the initial and maximum braking effort applied through the pedal 16 to the brakes of the draft vehicle 12.

TRANSDUCER OPERATION

With the general operation of the system of the present invention having been described, the operation of the transducer 14 will now be described with reference to FIGS. 3 through 9.

As illustrated in FIGS. 5 and 6, the transducer 14 is mounted on the actuating surface of the draft vehicle brake pedal 16 by means of the clamp 56 and screw 58 such that the foot 64 of the draft vehicle operator must engage the elastomeric cover on the top housing 36 to transmit braking pressure to the brake pedal 16 and the pedal lever 62.

Referring now to FIGS. 3, 4 and 7, the braking pressure applied to the top housing 36 acts against the biasing pressure of the adjustable cantilever spring 40 to effect a movement of the top housing 36 downward toward the base member or lower housing member 34.

This causes the thrust transmitter 74 to force the spring contact means 72 downward about the terminal or anchor 70.

Assume, for example, that an initial pressure is applied to the top housing 36 which is sufficient to overcome the bias of the cantilever spring 40 to a degree sufficient to cause the first spring contact finger 72B to engage the first printed contact 68B on the circuit board 66; and, further, that the selector switch 82 is out of engagement with the contact area 86 of the bus bar 76.

This adapts the transducer 14 to the two-wheel system of FIG. 2A, by isolating the bus bar 78 from cooperation with the switch means 72. Further, one of the resistors 88 has now been connected in circuit across the control leads 18A and 18B through the first printed contact 68B and the terminal 76B on the bus bar 76.

Current will now flow from the battery 30 through control lead 18A, terminal 70, switch means 72, first spring contact finger 72B, first printed contact 68B, one resistor 88, terminal 76B, bus bar 76, and control lead 18B to energize the electromagnetic actuators 20 shown in FIG. 2A.

If braking pressure increases, the spring contact fingers 72C, 72D, 72E, 72F and 72G can ultimately and in this order of progression engage printed contacts 68C-68G, respectively, in a collective manner. This places a plurality of the resistances 88 in parallel across the circuit paths 68C-76C, 68D-76D, 68E-76E, 68F-76F and 68G-76.

The foregoing circuit paths 68B-76B-68F-76F effect the delivery of increased operating current from the battery 30 to the magnetic actuators 20 of FIG. 2A by the well-known reduction of impedance effected by increasing the number of parallel resistors of equal value between circuit terminals.

For maximum braking pressure, the circuit path 68G-76 is effected, creating a short circuit from the terminal 70 through the switch means 72, contact finger 72G and last printed contact 68G to the bus bar 76. This shunts out the resistors 88 and effects delivery of maximum actuating current from the battery 30 to the actuators 20 of FIG. 2A; this current being limited only by the coil resistance of the said actuators 20.

Therefore, either gradual or sudden braking pressure may be readily applied, electrically, to the brake actuating means 20 on the wheels 22 of the drawn vehicle 10.

Because of the progressive nature of the engagement of the spring contact fingers 72B-72G with the printed contacts 68B-68G, the brake actuators 20 of FIG. 2A are energized through the first printed contact 68B, resistor 88 and bus bar 76 with very little applied pressure to the top housing 36, thus accomplishing the required lag in the application of the brakes in the draft vehicle 12 from the initial braking in the drawn vehicle 10.

This is effected even in sudden "panic" stops since the switch means 72 effects, although rapidly, a progressive switching of the resistors 88 in circuit across the control leads 18A and 18B prior to the full transmission of pressure from the foot 64 of the vehicle operator to the brake pedal 16 through the transducer 14.

The adjustable nature of the bias of the cantilever spring 40 (FIG. 3) provides the means to effect the necessary adaptation of the transducer 14 to the braking pressure characteristics of any given draft vehicle 12.

The required lag between draft and drawn vehicle braking can be adjusted by means of the cantilever spring 40, since the force needed to initially displace the spring 40 can be made less than that required to apply the brakes of the draft vehicle 12.

The curved shape of the spring contact fingers 72B–72G on the spring contact means 72 effects a wiping action against the respective printed contacts 68B–68G to maintain clean and positive electric contact therebetween. Therefore, these critical contacts are self-cleaning and substantially maintenance free.

In order to control the braking of a drawn vehicle 10 having four wheels 22, the selector switchblade 82 is moved on the pivot 80 such that the blade 82 makes electrical contact with the contact portion 86 on the first bus bar 76, thereby connecting the said bus bar 76 and the second bus bar 78 to the same circuit terminal, namely, the control terminal 74 on the second control lead 18B.

As a result of this selection, each progressive engagement of the spring contact fingers 72B–72F with the printed contacts 68B–68F will connect twice as many of the resistors 88 in parallel across the battery or source 30 as in the alternate position of the switchblade 82.

Since there are four electromagnetic brake actuators 20 for the drawn vehicle 10 in the configuration of FIG. 2B, requiring twice as much current for proportional energization and braking force as the configuration of FIG. 2A, this increase in the number of parallel resistances 88 will effectuate the necessary increase in actuating current for the increased number of electromagnetic actuators 20. In fact, in the contact progression 68B–68F, the actuating current will be increased at an increased rate in the system of FIG. 2B from the rate of increase in the system of FIG. 2A. This provides complete adaptability of the transducer 14 to either two-wheel or four-wheel braking systems for drawn vehicles 10.

In operation of the embodiment of FIGS. 10, 11 and 12, the operation of the transducer 14' is substantially identical to that of the transducer 14 in the embodiment of FIGS. 3 through 9.

The difference in operation resides in the use of the spring hinge means 94 to either augment or supplant the bias the effect of the cantilever spring 40 in the transducer 14.

For example, certain power brake systems for draft vehicles 12 may require very little spring bias to effect proper operation and, therefore, only the spring hinge means 94 will be required.

On the other hand, certain braking systems for draft vehicles 12, which do not have power assist means, may require such a magnitude of brake pedal actuating pressure that a cantilever spring 40 as will as a spring hinge 94 will be required to provide the bias sufficient to achieve proper coordination between the braking systems of the drawn vehicle 10 and the draft vehicle 12.

As can be readily seen from the foregoing specification and drawings, the present invention satisfies a long felt need in the art for a versatile, safe, dependable and fully synchronized systems for braking draft and drawn vehicle combinations, which systems include new and novel transducer means, fully coordinated and adjustable to the necessary actuating pressure required to brake the draft vehicle and simultaneously provide the proper systematic conditions to control the brakes of a drawn vehicle in synchronism with those of the draft vehicle.

Without further description it is believed that the advantages of the present invention over the prior art is apparent and while only several preferred embodiments of the same are illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

1. Control means effecting coordinated braking of a drawn vehicle with a related draft vehicle, said draft vehicle including a first braking means with a brake actuating means, said control means comprising:
  pressure responsive transducer means mounted on the brake actuating means of said draft vehicle such that actuating pressure for said brake actuating means is applied thereto through said transducer means;
  a source of energy;
  second braking means in said drawn vehicle adapted to be energized from said source of energy;
  said transducer means comprising a base mounted on the brake actuating means of said draft vehicle;
  circuit means on said base including a plurality of physically adjacent resistance elements, bus means common to one side of said resistance elements, and a plurality of fixed contact means electrically connected one to the other side of each of said resistance elements and one to said bus means in a substantially colinear spaced relationship;
  an input terminal connected to one side of said source;
  elongated spring contact means having one end thereof fixed to and electrically engaged with said input terminal and extending therefrom substantially colinear with said fixed contact means at an increasing distance from said contact means over the extent thereof;
  an output terminal on said bus means connected with said second braking means;
  a second plurality of resistance elements connected to said fixed contact means in similar manner to said first plurality at one end thereof;
  a second bus means connected in common to the other ends of said second plurality of resistance means;
  switch means selectively connecting said second bus means with said first bus means;
  said switch means thereby effecting selective parallel interconnection of said first plurality of resistance elements with respective ones of said second plurality of resistance elements to provide a decrease in resistance at a selectively increases rate in response to brake actuating pressure;
  a telescoping housing over said base means including thrust transmitting means engageable with said spring contact means over the length thereof; and
  means biasing said housing means away from said base means to preclude engagement of said spring contact means with any of said fixed contacts in the absence of an actuating force applied to said housing means to constrain the latter toward said base means.

2. The invention defined in claim 1, wherein said spring contact means further include a plurality of dependent contact fingers one adjacent each of said plurality of fixed contacts and increasingly spaced therefrom from a point adjacent said input terminal to said one of said fixed contacts on said bus means.

3. The invention defined in claim 2, wherein said contact fingers are curvilinear to effect a wiping action on said fixed contact means upon make and break therewith.

4. The invention defined in claim 1, wherein said circuit means further comprises a circuit board, substantially coextensive with and mounted on said base, having said resistance means on the lower surface thereof and said fixed contact means on the upper surface thereof, said resistance means being potted in said base.